US012698095B2

(12) United States Patent
Lóped et al.

(10) Patent No.: US 12,698,095 B2
(45) Date of Patent: Aug. 4, 2026

(54) SYSTEMS AND METHODS FOR ESTIMATING A FUEL LEVEL FOR A FLIGHT OF AN AIRCRAFT

(71) Applicant: THE BOEING COMPANY, Arlington, VA (US)

(72) Inventors: David Garrido López, Tres Cantos Madrid (ES); Johan De Prins, Molenstede (BE); Maxim Constantijn Vos, Móstoles (ES); Geun Il Kim, Bothell, WA (US); José Alexandre Tavares Guerreiro Fregnani, Sao Jose dos Campos (BR)

(73) Assignee: The Boeing Company, Arlington, VA (US)

( * ) Notice: Subject to any disclaimer, the term of this patent is extended or adjusted under 35 U.S.C. 154(b) by 166 days.

(21) Appl. No.: 18/496,099

(22) Filed: Oct. 27, 2023

(65) Prior Publication Data

US 2025/0136289 A1 May 1, 2025

(51) Int. Cl.
*B64D 45/00* (2006.01)
*G01M 9/08* (2006.01)

(52) U.S. Cl.
CPC ...... *B64D 45/00* (2013.01); *B64D 2045/0085* (2013.01); *G01M 9/08* (2013.01)

(58) Field of Classification Search
CPC ........ B64D 37/00; B64D 37/02; B64D 37/04; B64D 45/00; B64D 2045/0085; G01M 9/08
See application file for complete search history.

(56) References Cited

U.S. PATENT DOCUMENTS

| | | | |
|---|---|---|---|
| 10,424,210 B2 | 9/2019 | Garrido-Lopez | |
| 10,556,703 B1 * | 2/2020 | Skola | G07C 5/08 |
| 2008/0039988 A1 * | 2/2008 | Estabrook | G01C 23/00 |
| | | | 701/14 |
| 2011/0231056 A1 * | 9/2011 | Sjungargard | B64D 37/00 |
| | | | 701/36 |
| 2018/0261105 A1 * | 9/2018 | Garrido-Lopez | G06Q 10/047 |
| 2019/0061971 A1 * | 2/2019 | Kim | G08G 5/30 |
| 2019/0295425 A1 * | 9/2019 | Grimald | G08G 5/26 |
| 2020/0262575 A1 * | 8/2020 | Mennechet | G01F 9/023 |

FOREIGN PATENT DOCUMENTS

| | | |
|---|---|---|
| EP | 373272 | 12/2018 |

OTHER PUBLICATIONS

Baklacioglu, Modeling the fuel flow-rate of transport aircraft during flight phases using genetic algorithm-optimized neural networks, 2016, Aerospace Science and Technology (Year: 2016).*

(Continued)

*Primary Examiner* — Sara J Lewandroski
(74) *Attorney, Agent, or Firm* — Joseph M. Butscher; Carroll, Hoette & Butscher, LLC

(57) ABSTRACT

A system and a method include a control unit configured to determine drag factors and fuel flow factors for different phases of one or more prior flights of an aircraft, and determine a fuel level for one or more upcoming flights of the aircraft based on the drag factors and the fuel flow factors for the different phases of the one or more prior flights of the aircraft.

20 Claims, 4 Drawing Sheets

(56) References Cited

OTHER PUBLICATIONS

Lampe, Prediction of Aircraft Trip Fuel Deviations for Fuel Loading Decisions with a Deep Time Series Approach, Dec. 2022, Delft University of Technology (Year: 2022).*

Notification of Transmittal of the International Search Report and the Written Opinion for PCT/US2024/045108, dated Dec. 6, 2024.

Zhang et al: "Fuel Consumption Model of the Climbing Phase of Departure Aircraft Based on Flight Data Analysis," Sustainability, vol. 11, No. 16, (Aug. 12, 2018).

Lyu Yuan et al: "Flight performance analysis with data-driven mission parameterization: mapping flight operational data to aircraft performance analysis," Transportation Engineering, vol. 2, p. 10035 (Dec. 31, 2020).

Jacome Luis Bahamonde et al: "Wing aerostructural optimization with an analytical fuel consumption sensitivity model," CEAS Aeronautical Journal, Springer Vienna, Viennea, vol. 10, No. 3, pp. 719-732 (Nov. 22, 2018).

"Monitoring Real-Time Environmental Performance," Maggiore, Aero Quarterly, www.boeing.com/commercial/aeromagazine.

"Getting to grips with aircraft performance monitoring," Flight Operations Support & Line Assistance, Airbus, Dec. 2002.

* cited by examiner

SYSTEMS AND METHODS FOR ESTIMATING A FUEL LEVEL FOR A FLIGHT OF AN AIRCRAFT

FIELD OF THE DISCLOSURE

Examples of the present disclosure generally relate to systems and methods for estimating a fuel level for a flight of an aircraft.

BACKGROUND OF THE DISCLOSURE

Aircraft are used to transport passengers and cargo between various locations. Numerous aircraft depart from and arrive at a typical airport every day.

As can be appreciated, when operating an aircraft, it is desirable to reduce fuel costs. Fuel economy for an aircraft relates to a measure of energy efficiency of flight operations. Fuel typically represents a substantial portion of operating cost for an aircraft. Indeed, fuel cost can account for 70% of the total cost of flight operations. Accordingly, the higher the fuel consumption of the flight, the greater the total cost incurred by an operator. As such, airlines seek to strike a balance between flight time and fuel economy. Further, fuel consumption of an aircraft varies based on certain factors, such as the number of hours the aircraft has flown, the age and condition of the engines mounted in the aircraft, and the like. In general, older aircraft having older engines may consume more fuel than newer aircraft.

An aircraft may depart an airport having a weight that is near to a maximum certified takeoff weight limit. In this scenario, a central fuel tank of the aircraft is typically fully loaded with fuel. During a long haul flight, such as a flight lasting four or more hours, in the first three or four hours of the flight, fuel from the central fuel tank is first burned, while wing fuel tanks remain fully loaded, thereby ensuring a relatively steady load over a wing span during a beginning of cruise phase. After the central fuel tank is emptied, fuel from the wing fuel tanks is consumed, and down force associated with fuel loading is gradually relieved, leading to progressive wing bending and torsions to the wings during the remainder of the flight.

Such aeroelastic effects can influence total drag, particularly during later stages of a flight. That is, near the end of a flight, the fuel tanks contain significantly less fuel as compared to the beginning of the flight. Because there can be less fuel in wing fuel tanks near the end of the flight, wing bending and torsions can differ during different phases of the flight.

Currently, only a single set of factors is applied to an entire flight for flight planning computations. The single set of factors reflects an average drag degradation of the aircraft, and typically is determined from selected stable cruise flight parameters. However, different flight phases are not considered, thereby leading to fuel estimate inaccuracies, and potential unnecessary flight diversions (due to inaccurately perceived fuel overburns).

SUMMARY OF THE DISCLOSURE

A need exists for a system and a method for effectively and efficiently estimating a fuel level for a flight of an aircraft. Further, a need exists for a system and a method for accurately accounting for aeroelastic effects due to changing fuel levels during a flight of an aircraft. Additionally, a need exists for a system and a method for determining fuel level estimates based on all phases of a flight.

With those needs in mind, certain examples of the present disclosure provide a system including a control unit configured to determine drag factors and fuel flow factors for different phases of one or more prior flights of an aircraft, and determine a fuel level for one or more upcoming flights of the aircraft based on the drag factors and the fuel flow factors for the different phases of the one or more prior flights of the aircraft.

In at least one example, the control unit is further configured to receive flight data for the one or more prior flights of the aircraft. The control unit is configured to determine the drag factors and the fuel flow factors from the flight data.

The different phases can include a takeoff, a climb phase, a cruise phase, an approach, and a descent phase.

The aircraft can include a central fuel tank and one or more wing fuel tanks.

The system can also include a user interface including a display and an input device. The control unit is in communication with the user interface. The control unit is further configured to show configurable factors settings on the display.

In at least one example, the control unit is configured to determine the fuel level, at least in part, by adjusting for drag polar aeroelastic effects.

The control unit can be onboard the aircraft. The control unit can be further configured to automatically operate the aircraft during the one or more upcoming flights based on the fuel level determined for the one or more upcoming flights.

The control unit can be an artificial intelligence or machine learning system.

Certain examples of the present disclosure provide a method including determining, by a control unit, drag factors and fuel flow factors for different phases of one or more prior flights of an aircraft; and determining, by the control unit, a fuel level for one or more upcoming flights of the aircraft based on the drag factors and the fuel flow factors for the different phases of the one or more prior flights of the aircraft.

Certain examples of the present disclosure provide a non-transitory computer-readable storage medium comprising executable instructions that, in response to execution, cause one or more control units comprising a processor, to perform operations including: determining drag factors and fuel flow factors for different phases of one or more prior flights of an aircraft; and determining a fuel level for one or more upcoming flights of the aircraft based on the drag factors and the fuel flow factors for the different phases of the one or more prior flights of the aircraft.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

An aircraft uses a certain amount of fuel to travel from a departure airport to an arrival (or destination) airport. A goal when planning a flight is to carry an amount of fuel that results in a minimum amount of fuel (dictated by safety and/or regulatory considerations) remaining at the arrival airport. Carrying any additional fuel can be wasteful because the additional fuel increases the weight of the aircraft, and thereby increases the fuel consumption and emissions of the aircraft.

Examples of the present disclosure provide systems and methods that correct for a drag polar of an aircraft in order to accurately, effectively, and efficiently estimate or otherwise determine a fuel level for a flight of an aircraft. The drag polar is the relationship between the drag on an aircraft and other variables, such as lift, the coefficient of lift, angle-of-attack, and/or speed of the aircraft. As described herein, the systems and methods correct the drag polar of the aircraft for dynamic aeroelastic effects in long range flights (such as in in sectors long enough in which an aircraft is to burn an entire amount of fuel within a central fuel tank).

The systems and methods described herein improve trip fuel estimates computed by a flight management system (FMS) of an aircraft by using drag and fuel flow factors per climb phase, cruise phase, and descent phase (as opposed to current known methods, which consider a single set of drag and fuel flow factors applicable to all phase of flight). The systems and methods consider different performance factors per cruise altitude, cost index, and route. The systems and methods consider differences in performance computed from recorded flight data during quasi-steady moments during climb, cruise, and descent of a particular aircraft, especially observed during long range flights, instead of considering only a cruise phase.

Figure 1:
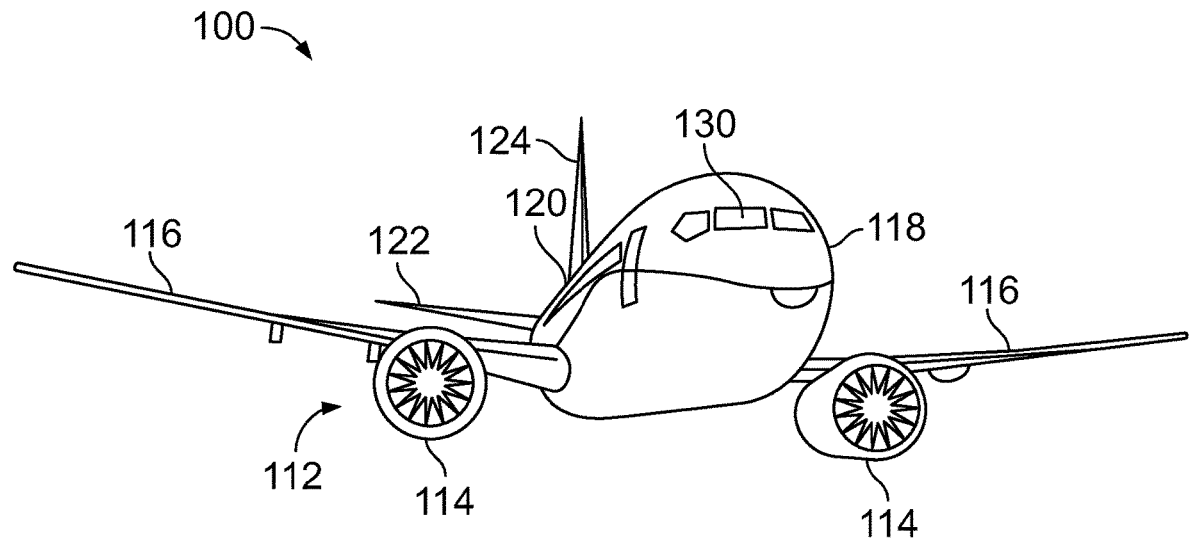
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124. The fuselage 118 of the aircraft 100 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like. FIG. 1 shows an example of an aircraft 100. It is to be understood that the aircraft 100 can be sized, shaped, and configured differently than shown in FIG. 1. The aircraft 100 can be configured to carry passengers, and/or cargo, for example.

Figure 2:
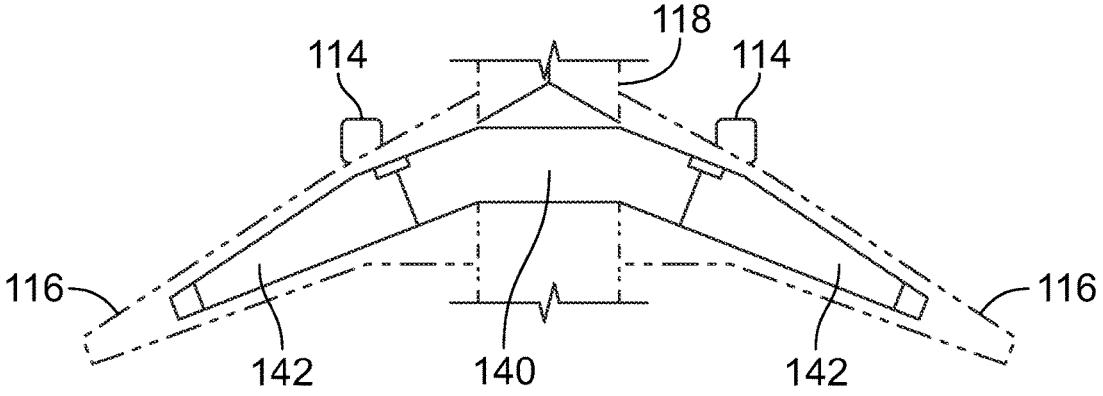
FIG. 2 illustrates a plan view of a central fuel tank and wing fuel tanks of an aircraft, according to an example of the present disclosure.

FIG. 2 illustrates a plan view of a central fuel tank 140 and wing fuel tanks 142 of an aircraft 100, according to an example of the present disclosure. During a long haul flight, fuel within the central fuel tank 140 may be consumed (for example, burned) before fuel within the wing fuel tanks 142. As such, the aeroelastic properties of the wings 116 may change as fuel within the wing fuel tanks 142 is burned. For example, as fuel within the wing fuel tanks 142 is burned, the wings 116 become lighter, which changes the aeroelastic properties of the wings 116 during a flight.

Optionally, the aircraft 100 can include the central fuel tank 140, but not the wing fuel tanks 142. As another example, the aircraft 100 includes the wing fuel tanks 142, but not the central fuel tank 140. As another example, the aircraft 100 includes the central fuel tank 140 and one of the wing fuel tanks 142. As another example, the aircraft 100 can include the central fuel tank 140, the wing fuel tanks 142, and one or more additional fuel tanks (not shown).

Figure 3:
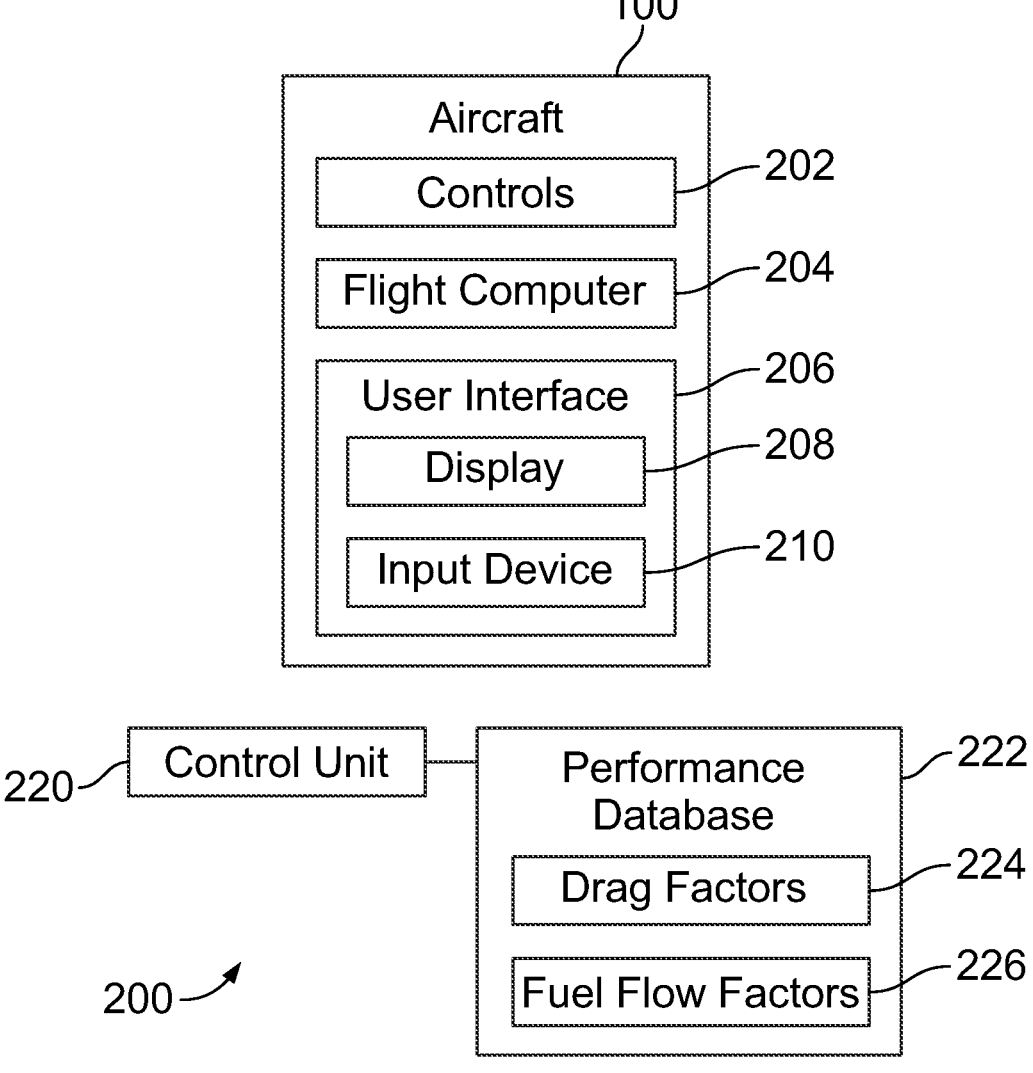
FIG. 3 illustrates a block diagram of a system for estimating a fuel level for an aircraft, according to an example of the present disclosure.

FIG. 3 illustrates a block diagram of a system 200 for estimating a fuel level for an aircraft 100, according to an example of the present disclosure. The aircraft 100 includes controls 202, which are used to control operation of the aircraft 100. Examples of the controls 202 include a steering console, a yoke, a joystick, one or more brakes, buttons, dials, keys, accelerators, buttons or pedals, and/or the like.

The aircraft 100 also includes a flight computer 204, which receives data for operating the aircraft 100. The flight computer 204 can be or otherwise include a flight management system (FMS). The flight computer 204 typically receives data regarding a flight plan between a departure airport and an arrival or destination airport, for example. The flight computer 204 can be used to control aspects of the aircraft 100. For example, the flight computer 204 can be used to automatically control operation of the aircraft 100.

The aircraft 100 also includes a user interface 206, which includes a display 208 and an input device 210. The user interface 206 can be within a cockpit or flight deck of the aircraft 100. The user interface 206 can be used by a pilot to monitor operations, control operations, review information, and/or the like. In at least one example, the display 208 is an electronic monitor, television, and/or the like, and the input device 210 includes one or more of a keyboard, a mouse, a stylus, and/or the like. In at least one example, the display 208 and the input device 210 are integrated as a touchscreen interface. In at least one example, the user interface 206 is a computer workstation. For example, the user interface 206 can be part of the flight computer 204. As another example, the user interface 206 is a handheld device, such as a smartphone, smart tablet, or the like. Optionally, examples of the present disclosure may not include a user interface, such as in an unmanned aircraft.

The system 200 includes a control unit 220 in communication with a performance database 222, such as through one or more wired or wireless connections. In at least one example, the control unit 220 and the performance database 222 are remote from the aircraft 100, such as at a ground-based location. In such an example, the control unit 220 can be at a separate location, and in communication with the aircraft 100 through one or more antennas, radios, transceivers, and/or the like. In at least one other example, the control unit 220 and the performance database 222 are onboard the aircraft 100. For example, the flight computer 204 can include the control unit 220. The control unit 220 is in communication with the user interface 206, such as through one or more wired or wireless connections.

The performance database 222 stores performance data for the aircraft 100. In at least one example, the performance database 222 stores the performance data for the particular aircraft 100, in contrast to data for a generic aircraft other than the aircraft 100. The performance data includes information regarding operational capabilities of the aircraft 100. For example, the performance data includes information regarding how much fuel the aircraft 100 having a particular weight will burn at a particular airspeed, at a particular altitude, for a particular period of time, etc. In at least one example, the performance data includes one or more performance models for the aircraft 100. The performance models for the aircraft can be predetermined and stored in a memory. The performance models can include generic performance models for a type, class, or family of aircraft. As an example, a generic performance model for a particular type of aircraft, such as a Boeing 737, can be determined upon the aircraft 100 being manufactured. The performance data can also be based on the generic performance model and historical data for the specific aircraft 100. In at least one example, the performance data is based on historical data from prior flights of the specific aircraft 100.

The performance database 222 stores drag factors 224 and fuel flow factors 226 for the aircraft 100. The drag factors 224 include aeroelastic effects for the aircraft during different phases of flight, such as climb, cruise, and descent phases. The drag factors 224 include the aeroelastic effects for the aircraft 100 during the different phases of flight at various speeds, weights, and the like. The fuel flow factors 226 include information regarding fuel consumption of the aircraft 100 during the different phases of flight.

In operation, the control unit 220 analyzes the drag factors 224 and the fuel flow factors 226 for the aircraft during the different phases of flight, such as the climb phase, the cruise phase, and the descent phase. The drag factors 224 and the fuel flow factors 226 differ during the different phases of flight. A first set of drag factors 224 and fuel flow factors 226 during a climb phase differs from a second set of drag factors 224 and fuel flow factors 226 during a cruise phase, which, in turn, differs from a third set of drag factors 224 and fuel flow factors 226 during a descent phase. The control unit 220 determines (for example, estimates) a fuel level for the aircraft 100 prior to a flight based on the drag factors 224 and the fuel flow factors 226 during the different phases of flight, instead of just an average set of factors or factors during a cruise phase. The drag factors 224 and the fuel flow factors 226 for the different phases of flight, such as the climb phase, the cruise phase, and the descent phase, are analyzed by the control unit 220, which can provide configurable parameters in the flight computer 204 (and which the control unit 220 can show on the display 208). In at least one example, the control unit 220 adjusts for drag polar aeroelastic effects and consequences for fuel flow based on the drag factors 224 and the fuel flow factors 226 during the different phases of flight. Because the control unit 220 analyzes the drag factors 224 and the fuel flow factors 226 for the different phases of flight (for example, each and every phase of flight), the control unit 220 synchronizes a trip fuel estimate of a flight plan (such as determined by the flight computer 204) with actual fuel burn in long range flights. Accordingly, discrepancy in trip fuel estimates is eliminated, minimized, or otherwise reduced, and pilots are able to rely on such data to determine whether there is sufficient fuel to safely reach a destination.

In at least one example, the control unit 220 provides the drag factors 224 and the fuel flow factors 226 for the climb phase, the cruise phase, and the descent phase of a flight, and can show such drag factors 224 and fuel flow factors 226 as configurable parameters on the display 208. As shown, the display 208 can be onboard the aircraft 100. Optionally, the display 208 can be remote from the aircraft 100. In at least one example, the control unit 220 can show such information on a display 208 within the aircraft 100, and another display 208 that is remote from the aircraft 100.

By analyzing the drag factors 224 and the fuel flow factors 226 for the different phases of flight (such as the climb phase, the cruise phase, and the descent phase), the control unit 220 adjusts a drag polar for the aeroelastic effects on the aircraft during the different phases and/or within one or more phases (such as in relation between a start of a cruise phase and an end of a cruise phase). As such, the control unit 220 provides more accurate fuel predictions for the flight computer 204 (which can be or otherwise include the flight management system), and/or flight planning systems.

In at least one example, for each phase of flight (that is, for each of the climb phase, the cruise phase, and the descent phase) for the aircraft 100, the control unit 220 combines the drag factors 224 and the fuel flow factors 226 to provide adjustments for fuel burn prediction. For example, the control unit 220 combines the drag factors 224 and the fuel flow factors 226 based on the following:

$$\Delta Wf_i = \Delta d_i \cdot \left( \frac{AVG_{FF}}{AVG_{GS}} \right) \cdot \frac{1}{(1 + \Delta FM)}$$

$$\Delta FM = -(DRAGfac + FFfac)$$

Where:

$\Delta Wfi$ = Fuel burn predicted at sector $i$ $\Delta di$ = Distance computed in sector $i$ (in nm)

$AVGFF$ = Fuel flow computed by the $FMS$ in the beginning of leg $i$ $AVGFS$ = Ground speed computed by the $FMS$ in the beginning of leg $i$ $\Delta FM$ = Fuel Mileage factor $DRAGfac$ = Drag factor loaded in the $FMS$ referred to the associated flight phase (Climb, Cruise or Descent).

$FFfac$ = Fuel Flow factor loaded in the $FMS$ referred to the associated flight phase (Climb, Cruise or Descent).

The control unit 220 can determine and/or otherwise analyze the drag factors 224 and the fuel flow factors 226 for the different phases of flight based on the equations noted above. Next, the control unit 220 can then estimate or otherwise determine a fuel level for the aircraft 100 before the flight based on the drag factors 224 and the fuel flow factors 226 for the different phases of flight. For example, Total Fuel Burnt in the entire flight will be therefore:

$$Wf = \sum_{i}^{N} \Delta Wf_i$$

Where: $N$ is the total number of legs in the flight plan

The above equations are merely examples. It is to be understood that the control unit 220 can determine a predicted fuel level based on other data, equations, and/or the like.

The climb phase can be defined as a sequence of legs between lift-off and a first level-off cruise point, which can be computed by the flight computer 204 (such as can be or otherwise include the FMS). The descent phase can be defined as a sequence of legs between a first top of descent point (T/D), and an initial approach fix (IAF) or 3000 feet above ground level when no IAF is present, as computed by the flight computer 204. The cruise phase can be defined as a sequence of legs between the top of descent and the top of climb, as computed by the flight computer 204.

In at least one example, the drag factors 224 and the fuel flow factors 226 can be determined by the control unit 220. For example, the control unit 220 can determine the drag factors 224 and the fuel flow factors 226 for the aircraft 100 from recorded flight data from past flights. In at least one example, the control unit 220 determines the drag factors 224 and the fuel flow factors 226 for the aircraft based on historic flight data (that is, information from previous flights), and parameters for each of the climb phase, the cruise phase, the descent phase during the previous flights. The control unit 220 can determine the drag factors 224 and the fuel flow factors 226 for the various different phases of flight from data from numerous prior flights of the aircraft 100. The control unit 220 can average the data from the prior flights to determine averages of the drag factors 224 and the fuel flow factors 226 from previous flights.

As described herein, the system 200 includes the control unit 220, which is configured to determine the drag factors 224 and the fuel flow factors 226 for different phases of one or more prior flights of the aircraft 100. The control unit 220 is further configured to determine a fuel level for one or more upcoming flights of the aircraft 100 based on the drag factors 224 and the fuel flow factors 226 for the different phases of the one or more prior flights of the aircraft 100. In at least one example, the control unit 220 is further configured to receive flight data for the one or more prior flights of the aircraft 100, and determine the drag factors 224 and the fuel flow factors 226 from the flight data.

Figure 4:
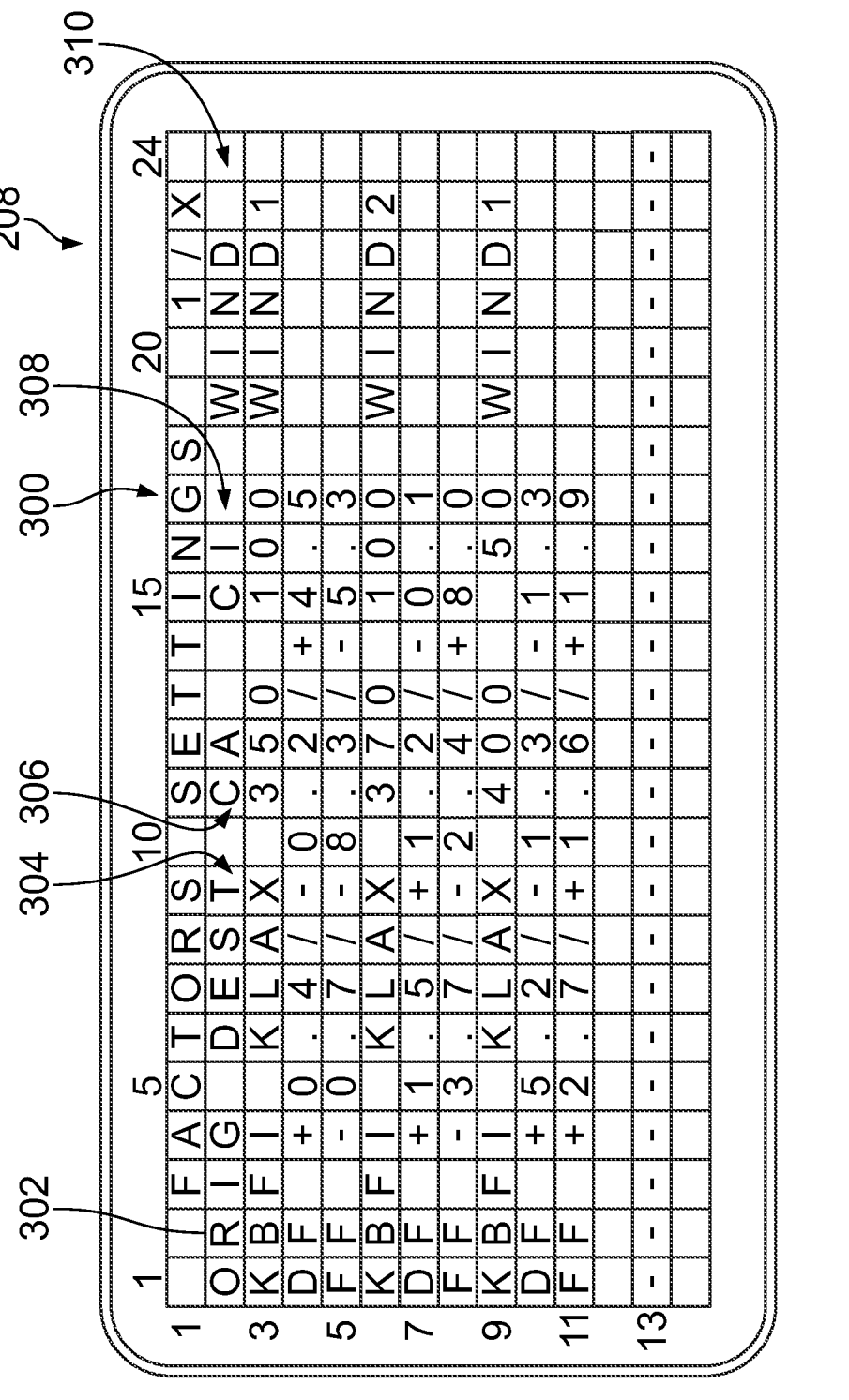
FIG. 4 illustrates a front view of a display, according to an example of the present disclosure.

FIG. 4 illustrates a front view of a display 208, according to an example of the present disclosure. Referring to FIGS. 3 and 4, the control unit 220 shows information regarding the drag factors 224 and the fuel flow factors 226 on the display 208. The control unit 220 can allow for different parameters to be adjusted by a user to provide different scenarios for fuel estimates.

For example, the control unit 220 can show adjustable factors settings 300 on the display 208. The factors settings 300 include adjustable inputs for an origination or origin airport 302, a destination airport 304, a cruise altitude 306, a cost index 308, a wind speed 310, air temperature at a cruise altitude (not shown), and/or the like.

The cost index 308 is a numerical value used to balance fuel costs against time savings. The cost index 308 represents the relative efficiency of flying faster or slower at a given time. A higher cost index favors faster flights, while a lower cost index favors fuel-efficient, slower flights. The cost index 308 helps operators make decisions about optimal flight speeds based on fuel prices and other operational factors (for example, crew cost, lease cost of an aircraft, and the like).

The control unit 220 shows the configurable factors settings 300 on the display 208 to allow an operator to input various different variables. For example, the drag factors 224 and the fuel flow factors 226 differ at different climb altitudes, cost indices, wind speeds, and wind temperatures. An operator can input different variables, and the control unit 220 can then determine (such as through interpolation) an estimated fuel level for the aircraft 100 based on such input variables.

Notably, one set of factors may not be adequate for all cruise altitudes and cost indices in a certain route. As such, the control unit 220 can provide a dedicated electronic page of factors settings 300 during a flight for varying performance factors for different scenarios. The shown parameters are used by the control unit 220 for fuel estimate computation, and can be retrieved and interpolated, based on cruise altitude and cost index inserted by an operator, and specific for a selected route.

Figure 5:
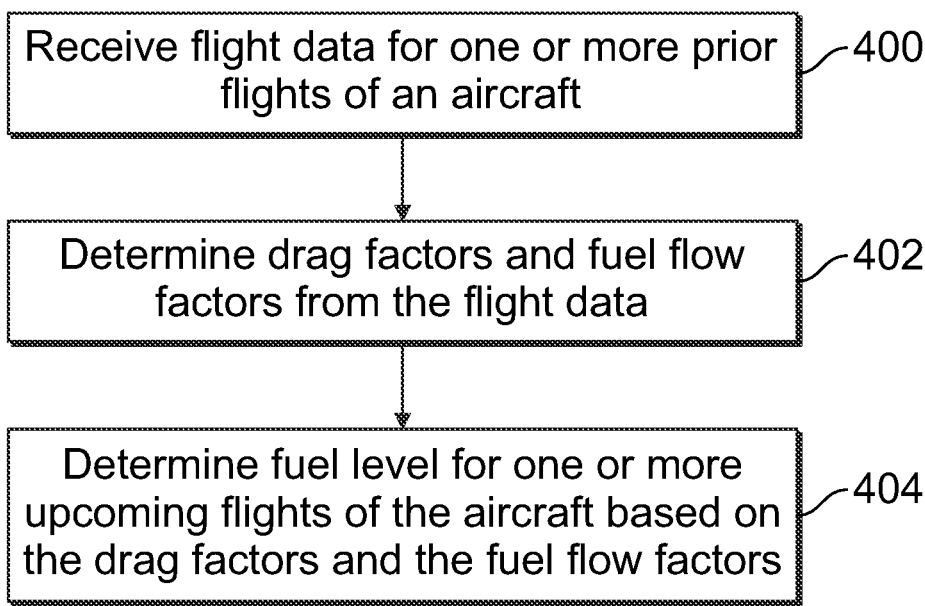
FIG. 5 illustrates a flow chart of a method, according to an example of the present disclosure.

FIG. 5 illustrates a flow chart of a method, according to an example of the present disclosure. Referring to FIGS. 1-5, at 400, the control unit 220 receives flight data for one or more prior flights of an aircraft 100. At 402, the control unit 220 determines the drag factors 224 and the fuel flow factors 226 for the aircraft 100 from the flight data. For example, the control unit 220 determines the drag factors 224 and the fuel flow factors 226 for each phase of the prior flights, including the climb phase, the cruise phase, and the descent phase. The control unit 220 can average the drag factors 224 and the fuel flow factors 226 for the different phases from the different flights. At 404, the control unit 220 then determines (for example, estimates, predicts, or the like) a fuel level for one or more upcoming flights (that is, flights not yet flown) for the aircraft based on the drag factors 224 and the fuel flow factors 226 for the different phases of flight of the aircraft 100.

Figure 6:
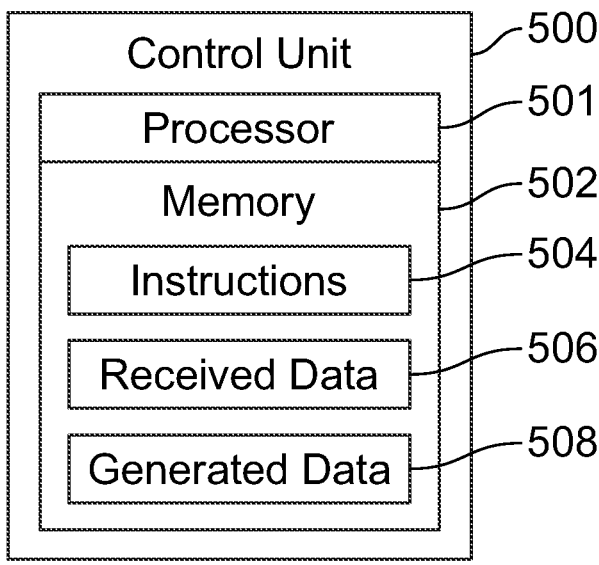
FIG. 6 illustrates a schematic block diagram of a control unit, according to an example of the present disclosure.

FIG. 6 illustrates a schematic block diagram of a control unit 500, according to an example of the present disclosure. The control unit 220 shown in FIG. 3 can be configured as the control unit 500. In at least one example, the control unit 500 includes at least one processor 501 in communication with a memory 502. The memory 502 stores instructions 504, received data 506, and generated data 508. The control unit 500 shown in FIG. 6 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 220 may be or include one or more processors that are configured to control operation, as described herein.

The control unit 220 is configured to execute a set of instructions that are stored in one or more data storage units or elements (such as one or more memories), in order to process data. For example, the control unit 220 may include or be coupled to one or more memories. The data storage units may also store data or other information as desired or needed. The data storage units may be in the form of an information source or a physical memory element within a processing machine.

The set of instructions may include various commands that instruct the control unit 220 as a processing machine to perform specific operations such as the methods and processes of the various examples of the subject matter described herein. The set of instructions may be in the form of a software program. The software may be in various forms such as system software or application software.

Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 220. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 220 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-6, examples of the subject disclosure provide systems and methods that allow large amounts of data to be quickly and efficiently analyzed by a computing device. For example, the control unit 220 can analyze various aspects of the aircraft 100 over numerous flights. As such, large amounts of data, which may not be discernable by human beings, are being tracked and analyzed. The vast amounts of data are efficiently organized and/or analyzed by the control unit 220, as described herein. The control unit 220 analyzes the data in a relatively short time in order to quickly and efficiently determine drag factors and fuel flow factors, which are in turn used to determine fuel levels for one or more flights of the aircraft 100. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 200, such as the control unit 220, provide and/or enable a computer system to operate as a special computer system for automatically determining fuel levels for flights. The control unit 220 improves upon standard computing devices by determining such information in an efficient and effective manner.

In at least one example, the control unit 220 can automatically operate the aircraft 100 based on the determined fuel level for the flight. For example, the control unit 220 can automatically operate one or more controls 202 (such as an autopilot system) to automatically control one or more aspects of the aircraft 100 to ensure that the aircraft 100 arrives at a destination with a predetermined amount of fuel. In this manner, the control unit 220 can automatically operate the aircraft to ensure that the aircraft 100 does not burn more than a predetermined limit of fuel.

In at least one example, all or part of the systems and methods described herein may be or otherwise include an artificial intelligence (AI) or machine-learning system that can automatically perform the operations of the methods also described herein. For example, the control unit 220 can be an artificial intelligence or machine learning system. These types of systems may be trained from outside information and/or self-trained to repeatedly improve the accuracy with how data is analyzed to automatically determine fuel levels. Over time, these systems can improve by determining such information with increasing accuracy and speed, thereby significantly reducing the likelihood of any potential errors. For example, the AI or machine-learning systems can learn and determine the performance capabilities of the aircraft 100, and automatically determine fuel levels for the aircraft 100. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of fuel level. The training minimizes conflicts and interference by performing an iterative training algorithm, in which the systems are retrained with an updated set of data (for example, data received before, during, and/or after each flight of the aircraft 100) and based on the feedback examined prior to the most recent training of the systems. This provides a robust analysis model that can better determine situational information in a cost effective and efficient manner.

Further, the disclosure comprises examples according to the following clauses:

Clause 1. A system comprising:

a control unit configured to:

determine drag factors and fuel flow factors for different phases of one or more prior flights of an aircraft; and determine a fuel level for one or more upcoming flights of the aircraft based on the drag factors and the fuel flow factors for the different phases of the one or more prior flights of the aircraft.

Clause 2. The system of Clause 1, wherein the control unit is further configured to receive flight data for the one or more prior flights of the aircraft, and wherein the control unit is configured to determine the drag factors and the fuel flow factors from the flight data.

Clause 3. The system of Clauses 1 or 2, wherein the different phases comprise a climb phase, a cruise phase, and a descent phase.

Clause 4. The system of any of Clauses 1-3, wherein the aircraft comprises a central fuel tank and one or more wing fuel tanks.

Clause 5. The system of any of Clauses 1-4, further comprising a user interface including a display and an input device, wherein the control unit is in communication with the user interface, and wherein the control unit is further configured to show configurable factors settings on the display.

Clause 6. The system of any of Clauses 1-5, wherein the control unit is configured to determine the fuel level, at least in part, by adjusting for drag polar aeroelastic effects.

Clause 7. The system of any of Clauses 1-6, wherein the control unit is onboard the aircraft.

Clause 8. The system of any of Clauses 1-7, wherein the control unit is further configured to automatically operate the aircraft during the one or more upcoming flights based on the fuel level determined for the one or more upcoming flights.

Clause 9. The system of any of clauses 1-8, wherein the control unit is an artificial intelligence or machine learning system.

Clause 10. A method comprising:

determining, by a control unit, drag factors and fuel flow factors for different phases of one or more prior flights of an aircraft; and determining, by the control unit, a fuel level for one or more upcoming flights of the aircraft based on the drag factors and the fuel flow factors for the different phases of the one or more prior flights of the aircraft.

Clause 11. The method of Clause 10, further comprising receiving, by the control unit, flight data for the one or more prior flights of the aircraft, and wherein said determining the drag factors comprises determining the drag factors and the fuel flow factors from the flight data.

Clause 12. The method of Clauses 10 or 11, wherein the different phases comprise a climb phase, a cruise phase, and a descent phase.

Clause 13. The method of any of Clauses 10-12, wherein the aircraft comprises a central fuel tank and one or more wing fuel tanks.

Clause 14. The method of any of Clauses 10-13, showing, by the control unit, configurable factors settings on a display of a user interface.

Clause 15. The method of any of Clauses 10-14, wherein said determining the fuel level comprises adjusting for drag polar aeroelastic effects.

Clause 16. The method of any of Clauses 10-15, wherein the control unit is onboard the aircraft.

Clause 17. The method of any of Clauses 10-16, further comprising automatically operating the aircraft during the one or more upcoming flights based on the fuel level determined for the one or more upcoming flights.

Clause 18. The method of any of Clauses 10-17, wherein the control unit is an artificial intelligence or machine learning system.

Clause 19. A non-transitory computer-readable storage medium comprising executable instructions that, in response to execution, cause one or more control units comprising a processor, to perform operations comprising:

determining drag factors and fuel flow factors for different phases of one or more prior flights of an aircraft; and determining a fuel level for one or more upcoming flights of the aircraft based on the drag factors and the fuel flow factors for the different phases of the one or more prior flights of the aircraft.

Clause 20. The non-transitory computer-readable storage medium of Clause 19, further comprising receiving flight data for the one or more prior flights of the aircraft, and wherein said determining the drag factors comprises determining the drag factors and the fuel flow factors from the flight data.

As described herein, examples of the present disclosure provide systems and methods for effectively and efficiently estimating a fuel level for a flight of an aircraft. Further, examples of the present disclosure provide systems and methods for accurately accounting for aeroelastic effects due to changing fuel levels during a flight of an aircraft. Additionally, examples of the present disclosure also provide systems and methods for determining fuel level estimates based on all phases (including climb, cruise, and descent) of a flight.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a control unit including one or more processors configured to:

adjust a drag polar of an aircraft for dynamic aeroelastic effects for different phases of one or more prior flights of the aircraft, wherein the aircraft includes a flight management system (FMS), wherein the aircraft is configured to be operated during flight phases including Climb, Cruise, and Descent, and wherein a drag factor is associated is loaded in the FMS and referred to as an associated flight phase (Climb, Cruise, or Descent), determine a fuel level for one or more upcoming flights of the aircraft based on the drag polar as adjusted for the different phases of the one or more prior flights of the aircraft, drag factors for the different phases of the one or more prior flights of the aircraft, and fuel flow factors for the different phases of the one or more prior flights of the aircraft, and automatically operate the aircraft during the one or more upcoming flights based on the fuel level determined for the one or more upcoming flights, and combine the drag factors and the fuel flow factors based on the following:

$$\Delta W f_i = \Delta d_i \cdot \left( \frac{AVG_{FF}}{AVG_{GS}} \right) \cdot \frac{1}{(1 + \Delta FM)}$$

$$\Delta FM = -(DRAFfac + FFfac)$$

Where:

$\Delta Wfi$ = Fuel burn predicted at sector $i$ $\Delta di$ = Distance computed in sector $i$ (in nm)

$AVGFF$ = Fuel flow computed by the $FMS$ in the beginning of leg $i$ $AVGGS$ = Ground speed computed by the $FMS$ in the beginning of leg $i$ $\Delta FM$ = Fuel Mileage factor $DRAGfac$ = Drag factor loaded in the $FMS$ referred to the associated flight phase (Climb, Cruise or Descent)

$FFfac$ = Fuel flow factor loaded in the $FMS$ referred to the associated flight phase (Climb, Cruise or Descent).

2. The system of claim 1, wherein the control unit is further configured to receive flight data for the one or more prior flights of the aircraft, and wherein the flight data includes the drag factors and the fuel flow factors.

3. The system of claim 1, wherein the different phases comprise a climb phase, a cruise phase, and a descent phase.

4. The system of claim 1, wherein the aircraft comprises a central fuel tank and one or more wing fuel tanks.

5. The system of claim 1, further comprising a user interface including a display and an input device, wherein the control unit is in communication with the user interface, and wherein the control unit is further configured to show configurable factors settings on the display.

6. The system of claim 1, wherein the drag polar is a relationship between drag on the aircraft and a coefficient of lift, angle-of-attack, and speed of the aircraft.

7. The system of claim 1, wherein the control unit is onboard the aircraft.

8. The system of claim 1, wherein the aircraft is configured to be operated during an entire flight according to a flight plan, wherein the control unit is further configured to estimate the fuel level for the aircraft before the one or more upcoming flights based on the following:

Total Fuel Burnt in the entire flight will be therefore:

$$W f = \sum_{i}^{N} \Delta W f_i$$

Where: $N$ is the total number of legs in the flight plan.

9. The system of claim 1, wherein the control unit is an artificial intelligence or machine learning system.

10. The system of claim 1, further comprising the aircraft.

11. A method comprising:

adjusting, by a control unit including one or more processors, a drag polar of an aircraft for dynamic aeroelastic effects for different phases of one or more prior flights of the aircraft, wherein the aircraft includes a flight management system (FMS), wherein the aircraft is configured to be operated during flight phases including Climb, Cruise, and Descent, and wherein a drag factor is loaded in the FMS and referred to as an associated flight phase (Climb, Cruise, or Descent);

determining, by the control unit, a fuel level for one or more upcoming flights of the aircraft based on the drag polar as adjusted for the different phases of the one or more prior flights of the aircraft, drag factors for the different phases of the one or more prior flights of the aircraft, and fuel flow factors for the different phases of the one or more prior flights of the aircraft;

automatically operating the aircraft during the one or more upcoming flights based on the fuel level determined for the one or more upcoming flights; and combine the drag factors and the fuel flow factors based on the following:

$$\Delta W f_i = \Delta d_i \cdot \left( \frac{AVG_{FF}}{AVG_{GS}} \right) \cdot \frac{1}{(1 + \Delta FM)}$$

$$\Delta FM = -(DRAFfac + FFfac)$$

Where:

$\Delta Wfi$ = Fuel burn predicted at sector $i$ $\Delta di$ = Distance computed in sector $i$ (in nm)

$AVGFF$ = Fuel flow computed by the $FMS$ in the beginning of leg $i$ $AVGGS$ = Ground speed computed by the $FMS$ in the beginning of leg $i$ $\Delta FM$ = Fuel Mileage factor $DRAGfac$ = Drag factor loaded in the $FMS$ referred to the associated flight phase (Climb, Cruise or Descent)

$FFfac$ = Fuel flow factor loaded in the $FMS$ referred to the associated flight phase (Climb, Cruise or Descent).

15
16

12. The method of claim 11, wherein the different phases comprise a climb phase, a cruise phase, and a descent phase.

13. The method of claim 11, wherein the aircraft comprises a central fuel tank and one or more wing fuel tanks.

14. The method of claim 11, showing, by the control unit, configurable factors settings on a display of a user interface.

15. The method of claim 11, further comprising receiving, by the control unit, flight data for the one or more prior flights of the aircraft, and wherein the flight data includes the drag factors and the fuel flow factors from the flight data.

16. The method of claim 11, wherein the control unit is onboard the aircraft.

17. The method of claim 11, further comprising estimating the fuel level for the aircraft before the one or more upcoming flights based on the following:

Total Fuel Burnt in the entire flight will be therefore:

$$Wf = \sum_i^N \Delta Wf_i$$

Where: $N$ is the total number of legs in the flight plan.

18. The method of claim 11, wherein the control unit is an artificial intelligence or machine learning system.

19. A system comprising:

an aircraft including a flight management system (FMS), wherein the aircraft is configured to be operated during flight phases including Climb, Cruise, and Descent, and wherein a drag factor is loaded in the FMS and referred to as an associated flight phase (Climb, Cruise, or Descent);

a user interface including a display and an input device; and a control unit including one or more processors, wherein the control unit is in communication with the user interface, and wherein the control unit is configured to:

show configurable factors settings on the display, receive flight data for the one or more prior flights of the aircraft, and wherein the flight data includes drag factors for different phases of one or more prior flights of the aircraft, and fuel flow factors for different phases of one or more prior flights of the aircraft, wherein the different phases comprise a climb phase, a cruise phase, and a descent phase, adjust a drag polar of the aircraft for dynamic aeroelastic effects for different phases of one or more prior flights of the aircraft, wherein the drag polar is a relationship between drag on the aircraft and a coefficient of lift, angle-of-attack, and speed of the aircraft, and determine a fuel level for one or more upcoming flights of the aircraft based on the drag polar as adjusted for the different phases of the one or more prior flights of the aircraft, drag factors for the different phases of the one or more prior flights of the aircraft, and fuel flow factors for the different phases of the one or more prior flights of the aircraft, automatically operate the aircraft during the one or more upcoming flights based on the fuel level determined for the one or more upcoming flights, and combine the drag factors and the fuel flow factors based on the following:

$$\Delta Wf_i = \Delta d_i \cdot \left( \frac{AVG_{FF}}{AVG_{GS}} \right) \cdot \frac{1}{(1 + \Delta FM)}$$

$$\Delta FM = -(DRAFfac + FFfac)$$

Where:

$\Delta Wfi$ = Fuel burn predicted at sector $i$ $\Delta di$ = Distance computed in sector $i$ (in nm)

$AVGFF$ = Fuel flow computed by the *FMS* in the beginning of leg $i$ $AVGGS$ = Ground speed computed by the *FMS* in the beginning of leg $i$ $\Delta FM$ = Fuel Mileage factor $DRAGfac$ = Drag factor loaded in the *FMS* referred to the associated flight phase (Climb, Cruise or Descent)

$FFfac$ = Fuel flow factor loaded in the *FMS* referred to the associated flight phase (Climb, Cruise or Descent).

20. The system of claim 19, wherein the control unit is further configured to estimate the fuel level for the aircraft before the one or more upcoming flights based on the following:

Total Fuel Burnt in the entire flight will be therefore:

$$Wf = \sum_i^N \Delta Wf_i$$

Where: $N$ is the total number of legs in the flight plan.

* * * * *